United States Patent [19]

Harney

[11] 4,298,280
[45] Nov. 3, 1981

[54] INFRARED RADAR SYSTEM

[75] Inventor: Robert C. Harney, Acton, Mass.

[73] Assignee: Massachusetts Institute of Technology, Cambridge, Mass.

[21] Appl. No.: 78,791

[22] Filed: Sep. 25, 1979

[51] Int. Cl.³ .................... G01C 3/08; G01P 3/36; H01J 31/49
[52] U.S. Cl. .................. 356/5; 250/332; 250/334; 250/341; 250/342; 356/28.5; 358/105; 358/109; 358/113
[58] Field of Search ............ 356/4, 5, 28, 28.5; 250/341, 342, 332, 334; 358/105, 109, 113

[56] References Cited

U.S. PATENT DOCUMENTS

| | | | |
|---|---|---|---|
| 3,298,024 | 1/1967 | Bohm | 356/4 |
| 3,652,161 | 3/1972 | Ross | 356/5 |
| 3,783,271 | 1/1974 | Abbott, Jr. et al. | 356/152 |
| 3,897,150 | 7/1975 | Bridges et al. | 358/109 |
| 3,953,667 | 4/1976 | Layton et al. | 358/113 |
| 4,019,060 | 4/1977 | Woodman | 356/152 |
| 4,025,193 | 5/1977 | Pond et al. | 356/5 |
| 4,040,744 | 8/1977 | Schertz et al. | 250/342 |
| 4,190,361 | 2/1980 | Dubrunfaut | 356/28 |

FOREIGN PATENT DOCUMENTS 2052086 4/1972 Fed. Rep. of Germany .......... 356/5

OTHER PUBLICATIONS

R. J. Hull et al., Proc. 1978 National Aerospace & Electronics Conf. (IEEE), Dayton, Ohio, May 16-18, 1978, p. 1.

Primary Examiner—S. C. Buczinski
Attorney, Agent, or Firm—Arthur A. Smith, Jr.; Mark G. Lappin

[57] ABSTRACT

An infrared radar system. The system includes an infrared laser and associated controller which are adapted to provide a succession of transmit pulses having a relatively high intensity spike portion followed by a relatively low intensity quasi-CW portion. An optical system directs the transmit pulses to a target scene and collects infrared radiation reflected from the scene. The collected radiation is imaged on a heterodyne detector array together with a locally generated reference infrared beam. A range network is responsive to signals from the detector array to provide signals representative of the range of objects in the target scene. A moving target indicator network is responsive to signals from the detector to provide signals representative of the velocity of objects in the target scene.

13 Claims, 6 Drawing Figures

INFRARED RADAR SYSTEM

The Government has rights in this invention pursuant to Contract Number AF19628-78-C-0002 awarded by the U.S. Department of the Air Force.

REFERENCE TO RELATED APPLICATION

This application is related to my U.S. patent application Ser. No. 078,783, entitled Display System, filed on even date herewith.

BACKGROUND OF THE DISCLOSURE

The field of this invention is radar and more particularly, infrared imaging radar.

In conventional microwave radar systems, electromagnetic radiation from a power oscillator is directed by a transmit/receive switch, through an antenna onto a scene-to-be-imaged. The radiation reflected by targets within the scene is collected by an antenna and directed through the transmit/receive switch into a mixer where it is heterodyned with microwave radiation from a local oscillator. The heterodyned signal is then electronically processed to extract range, velocity and reflectivity information for the targets.

Conventional infrared radar systems also transmit electromagnetic radiation but rather from a transmitter laser typically, the laser radiation is directed by a transmit/receive switch, through a telescope and onto a target. The radiation reflected by the target is then collected by the telescope and directed through the transmit/receive switch and onto an optical detector. This detected radiation is heterodyned with radiation from a local oscillator laser. The heterodyned signal is then electronically processed to extract range, velocity and reflectivity information for the targets. The principle differences between the microwave and infrared radar systems are the wavelength of the electromagnetic radiation employed (microwave versus infrared), and the specific devices which perform the necessary radar functions (e.g. magnetrons versus lasers, antennas versus telescopes, and the like). In view of the wavelength difference, infrared systems generally offer higher resolution, while microwave systems generally offer better performance in bad weather.

Currently, microwave radar systems provide terrain following capability, permitting all-weather, day/night low level flight aircraft operation at extremely low altitudes and relatively high speeds. However, at low altitudes, for example, below 50 meters, many flight applications require a substantial obstacle avoidance capability in addition to terrain following. Since obstacle detection requires extremely high resolution, that is not practical with microwave radars.

Infrared laser airborne radar systems have recently been developed for use as bad-weather, day/night, obstacle avoidance systems on tactical aircraft involved in close air support missions. See for example Hull, R. J., Marcus, S. "A Tactical 10.6 um Imaging Radar", *Proc. 1978 National Aerospace and Electronics Conf.* (IEEE, Dayton, Ohio, May 1978). In such systems, there are two modes of operation. In a target acquisition (or obstacle detection) mode, a $CO_2$ laser generates a continuous wave (CW) infrared beam. This beam is shaped into a fan beam and projected through a telescope and directed by a pointer scanner mirror assembly onto the ground in front of the aircraft. A combination of the aircraft's forward motion and a horizontal rocking motion of the pointer-scanner mirror assembly provides a line scan search of the area in front of the aircraft. The back-reflected radiation is collected by the telescope, and imaged onto a one-dimensional array of of heterodyne detectors together with the beam from a local oscillator laser. The outputs from the heterodyne detectors are then Doppler-analyzed to provide a moving target indication (MTI). When a moving target (or obstacle) is detected, the pointer-scanner mirror is adaptively pointed in the direction of the target, and the transmitter laser is switched to an obstacle avoidance mode. In this second mode, the system operates as a laser-aided forwarded looking infrared imaging (FLIR) system. The laser is repetitively-pulsed, and a two-dimensional image plane scanner is activated. This second mode of operation provides a high resolution point-by-point raster scanned CRT image of the target for identification purposes. Range information from the reflected pulse delays are then used in conjunction with the azimuth-elevation information from the image and information from the aircraft's inertial platform to provide obstacle avoidance control signals for the aircraft. This form of system is also suitable for fire control.

Although the latter form of prior art infrared radar systems does provide target range, velocity and reflectivity characteristics suitable for use in terrain avoidance and target acquisition and identification, the performance of such systems are substantially limited since such systems cannot provide both MTI and high resolution ranging operation at the same time.

Accordingly, it is an object of the present invention to provide an improved radar system which simultaneously provides range and moving target identification information.

Another object is to provide an improved radar system providing capability of terrain and obstacle avoidance and in addition, target acquisition and identification.

Yet another object is to provide an improved radar system which simultaneously provides active and passive imaging.

It is a further object to provide an improved radar system having a closed-loop fire control capability.

SUMMARY OF THE INVENTION

Briefly, the present invention includes an infrared transmitter laser, an array of optical detecting elements and an associated optical system for directing the beam from the laser to a target scene, and for collecting reflected portions of that beam and imaging those portions on the detector array. A signal processing network is coupled to the detector array. A local oscillator laser and an associated optical system are adapted to image a reference beam from the local oscillator laser on the detector array.

The transmitter laser is selectively operable in a pulsed mode or a continuous (CW) mode. A controller is adapted to control the operational mode of the laser transmitter so that the transmitted beam includes at least one pulse having a spike portion and a CW portion. In response to signals generated by detector array from received reflections of the spike portions of the transmitted beam, the signal processing network generates data representative of the range and reflectivity of objects in the target scene. In response to signals generated by the detector array from the CW portions of the transmitted beam, the signal processing network generates data representative of the velocity and reflectivity of objects in the target scene.

In alternative configurations, the system may further include conventional active and passive radiation imaging networks which may be operative simultaneously with the MTI and ranging networks.

With this configuration, the system of the present invention may provide all of the following functions: (1) wide angle search (that is wide field of view, low resolution imaging) in either an active (reflected radiation) or passive (thermal radiation) mode; (2) target ranging; (3) Doppler resolution of target velocities (allowing moving target indication to be performed); (4) target identification (using narrow field of view, high resolution imaging) in either the active or passive mode; and (5) target designation.

With the present invention, the wide angle search mode coupled with ranging to each point in a target scene provides all the information necessary for a pilot for terrain avoidance in low level flight. In addition, MTI may be performed simultaneously, so that the pilot may have an automatic target acquisition capability. The high resolution imaging capability permits rapid identification of suspected targets (both passive and active modes are useful in this function since some targets have better passive signatures than active signatures and vice versa). Coupled with a ranging capability, the high resolution imager provides sufficient information for closed loop fire control.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
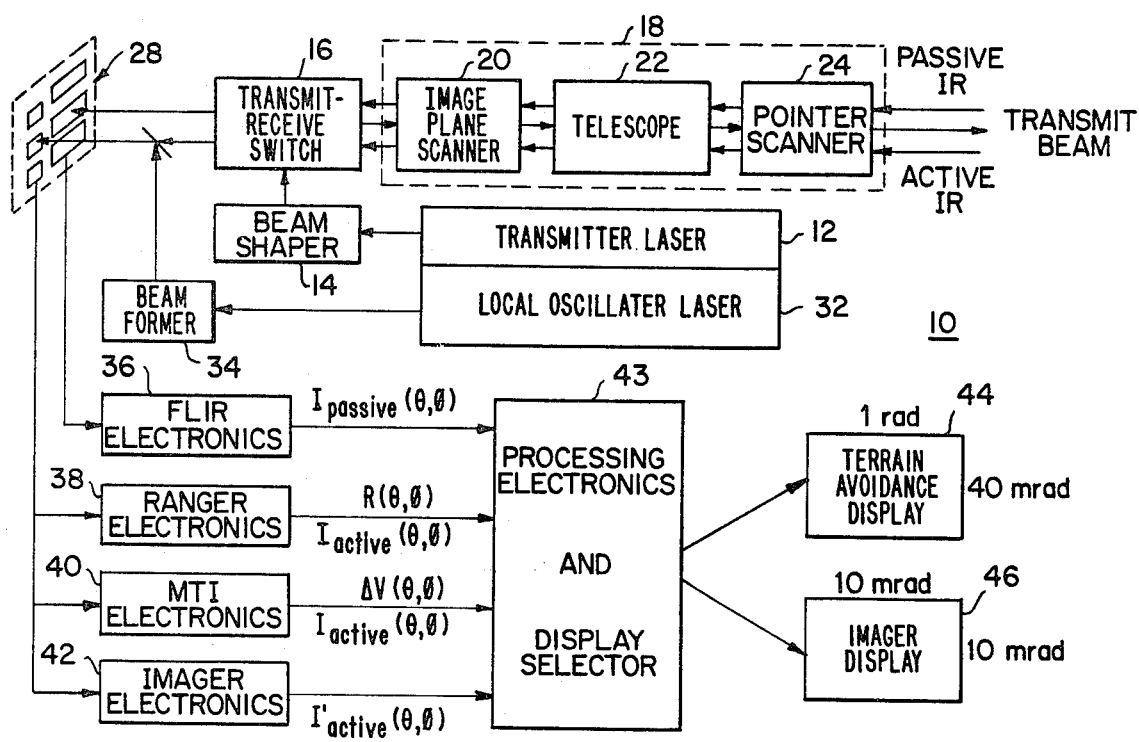
FIG. 1 shows in block diagram form, an embodiment of the present invention.
Figure 2A:
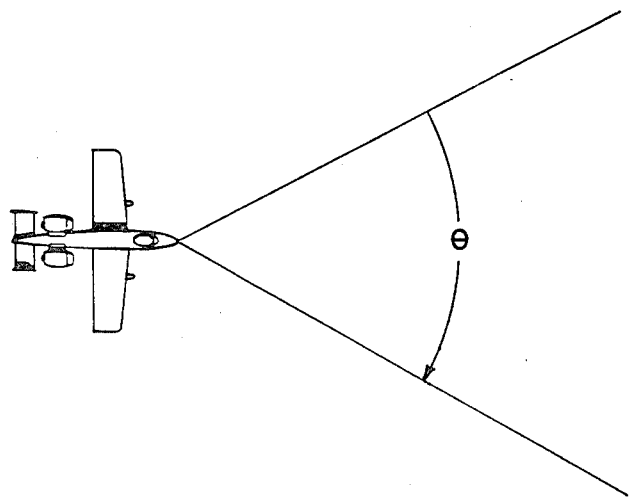
FIGS. 2A and 2B define the angular coordinates of pixels in a target scene for use with the system of FIG. 1.
Figure 2B:
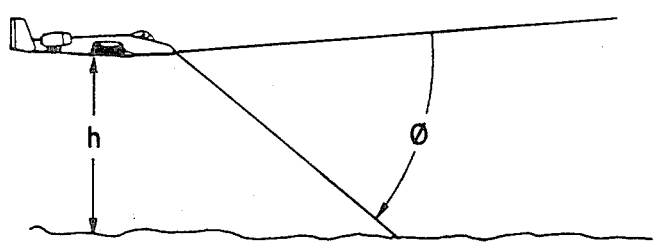

FIG. 1 shows an infrared imaging radar system 10 in accordance with the present invention. This embodiment is particularly adapted for airborne use with the target scene lying in the direction of travel of an aircraft. FIGS. 2A and 2B schematically illustrate such a configuration where $\theta$ and $\phi$ define angular coordinates of pixels in a target scene.

The system 10 includes an infrared (10.6 micrometer) transmitter laser 12 (such as $CO_2$ laser) and associated beam shaper 14, transmit-receive switch 16, input/output optical system 18 (including a conventional image plane scanner 20, telescope 22, and pointer-scanner 24), and detector element array 28.

The transmit-receive switch 16 is adapted to direct the shaped transmit beam from laser 12 and shaper 14 through the optical system 18. System 18 selectively scans the transmit beam in a raster pattern across the target scene. System 18 also collects both passive infrared radiation (i.e. thermal radiation) and active infrared radiation (i.e. the reflected portion of the transmitted beam from laser 12) from the target scene, and images that received radiation onto the detector array 28 by way of transmit-receive switch 16. In the present embodiment, each element of the array 28 includes both direct and heterodyne detector cells, both being adjacent photovoltaic HgCdTe cells on the same semiconductor chip. A local oscillator laser 32 and associated beam former 34 images a reference infrared beam on the heterodyne cells of detector array 28.

The direct cells of the detector array 28 are coupled to forward looking infrared radar (FLIR) electronics network 36. The heterodyne cells of array 28 are coupled to ranger electronics network 38, MTI electronics network 40 and imager electronics network 42. All of networks 36, 38, 40 and 42 are coupled to processing electronics and display selector network 43, which in turn is coupled to terrain avoidance display 44 and imager display 46. The signals from the direct detector cells in array 28 are processed conventionally in block 43 to provide passive image information. The signals from the heterodyne detector cells in array 28 are processed in block 43 in various modes of operation as described below to yield range, Doppler (moving target indication) and/or active image formation. This information is selectively displayed to the user in displays 44 and 46. The displays may be conventional, or, alternatively, may be a quasi-three-dimensional color display where the range information is coded into a color scale (e.g. blue corresponding to distant points, red corresponding to near points, and various shades of purple corresponding to points at intermediate ranges.

The FLIR network 36 (for providing passive imaging) and the imager network 42 (for providing active imaging) are conventional networks. The ranger network 38 and MTI network 40 will now be described.

Figure 3:
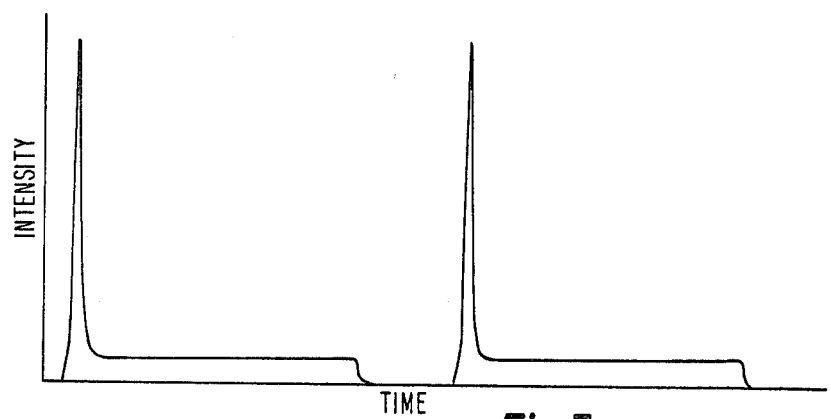
FIG. 3 shows waveforms of exemplary transmit pulses generated by the transmit laser of the system of FIG. 1.

Generally, range measurement (or ranging) requires transmission of a short high intensity laser pulse and measuring the time delay to the reception of the strongest return. Doppler (or MTI) measurement, in contrast, requires transmission of a long quasi-CW pulse with a stable frequency, and measuring the difference between the transmitted and received frequencies. In the prior art, only a single pulse is utilized for each pixel, and thus the two functions are mutually exclusive. However, in accordance with the present invention, laser 12 produces transmit pulses of the shape shown in FIG. 3, permitting both range and Doppler information to be obtained simultaneously. Each transmit pulse includes a high intensity spike at the start of the pulse for obtaining range information, and includes a relatively long (quasi-CW) low intensity portion, providing the stable frequency for Doppler analysis.

Figure 4:
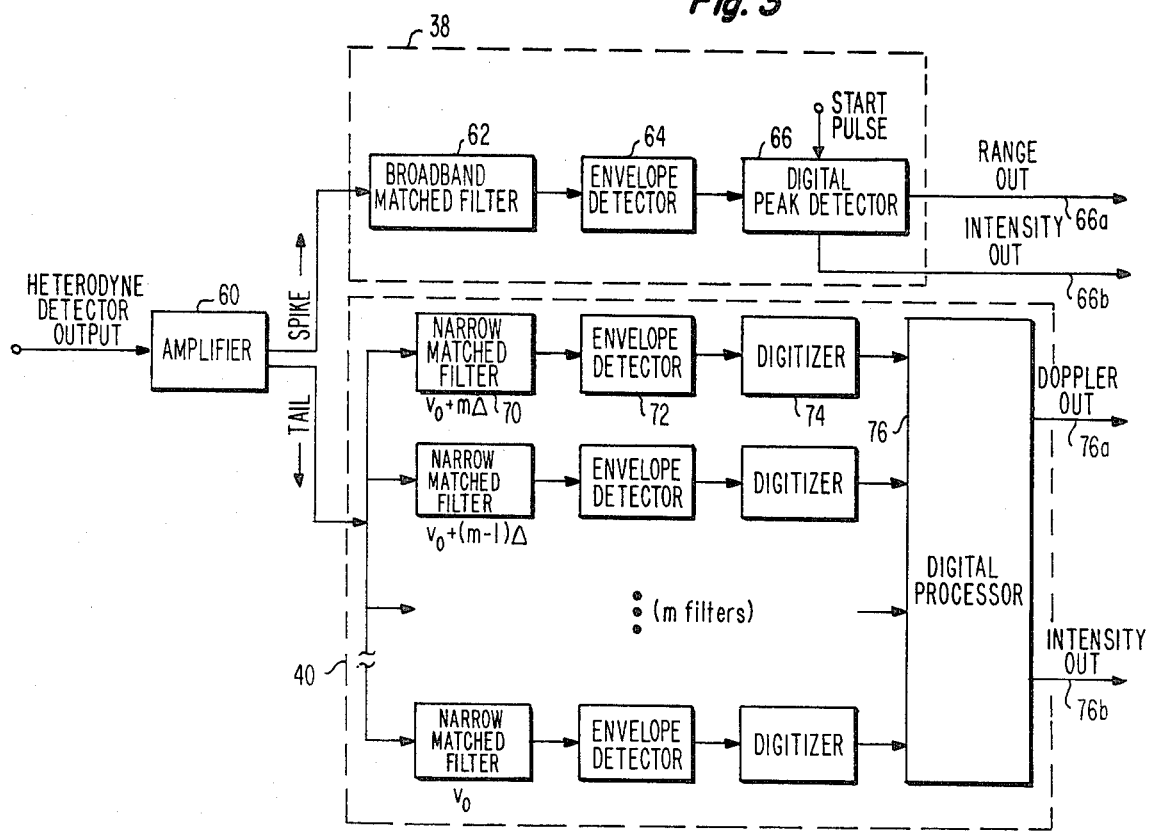
FIG. 4 shows in block diagram form, the ranger and moving target indicator networks of the system of FIG. 1.

FIG. 4 shows in detailed block diagram form the ranger network 38 and MTI network 40 for performing the simultaneous range-Doppler measurement. In that figure, the output signal from each heterodyne detector cell is amplified by amplifier 60 and applied by way of a "spike" channel to network 38, and by way of a "tail" channel to network 40. Network 38 basically processes only the reflections from the high intensity spike of the transmit pulses. This network includes a broad band matched filter 62 (which is matched to the frequency content of the spike), an envelope detector 64 and a digital peak detector 66. In operation, the signal in the spike channel is passed through the filter 62 and applied to an envelope detector 64. The resultant signal is then analyzed by a digital peak detector 66 which determines the time after receipt of a start pulse (generated by the laser 12 and associated circuitry) at which maximum signal occurs, and the magnitude of that signal. The time value is directly related to the range. Detector 66 provides a range signal $R(\theta, \phi)$ on line 66a representative of this value, and also an intensity signal $I_{active}$ on line 66b representative of the peak value.

The network 40 includes a plurality (m) of branches, each including a narrow matched filter 70, envelope detector 72 and digitizer 74 coupled in series, with the output of all the digitizers being coupled to a digital processor 76. The m filters 70 of the branches cover the range of expected Doppler-shifted frequencies, $V_o+m\Delta$, $V_o+(m-1)\Delta$, ... $V_o$. The digital outputs from the digitizers 74 are sampled once each dwell time by processor 76 and conventionally analyzed to yield the Doppler shift and the intensity. The Doppler shift is determined by summing the temporal outputs in each branch over the interpulse time and determining which branch yields the largest value. A Doppler signal $\Delta V(\theta,\phi)$ representative of this value is provided on line 76a. The intensity is determined by summing the outputs of all the branches. An intensity signal $I_{active}$ representative of this value is provided on line 76b.

In the present embodiment, the transmit pulses of the specified shape are produced by electro-optically Q-switching the $CO_2$ laser 12, where the Q is held low for a short period, then switched to a high value and held. As a result of the Q-switching, an initial spike results. Since following the spike, the Q is held high enough to sustain CW oscillation, the tail end of the pulse does not die out (as in conventional Q-switching), but rather approaches a constant CW level. Some time after the steady state has been reached, the Q is switched back to a low value to extinguish the oscillation and permitting gain to build back up to a high level for the next pulse.

By way of example, the laser 12 may have the form shown by S. Marcus and J. W. Count in "A $CO_2$ Laser For A Compact Imaging Radar," *Proceedings of The International Conference on Lasers* 1978, December 1978, pp. 464–468. In this form, the laser 12 is located in a single housing enclosing a twice-folded resonant cavity. The cavity includes a diffraction grating for wavelength selection, and a piezoelectrically mounted output mirror. A central chamber of stainless steel houses the gas supply for the laser and, in addition, annular copper cathodes. Beryllium oxide laser tubes are coupled coaxially from the cathodes and extend outside the chamber. Fins are bolted to each tube to provide cooling by forced air convection. A zinc selenide Brewster windows are epoxied to stainless steel mounts at the ends of the tubes. The mounts serve as high voltage anodes for the laser.

Figure 5:
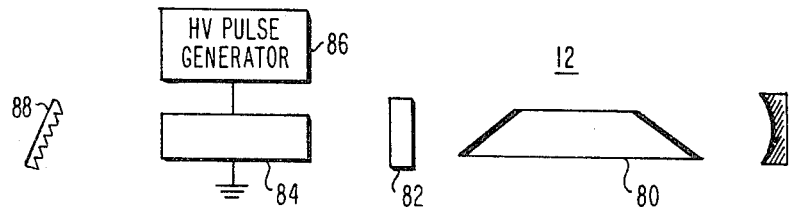
FIG. 5 shows in schematic form, the laser and associated control network of the system of FIG. 1.

The laser 12 is shown schematically in FIG. 5, and includes $CO_2$ laser tube 80, CdS phase plate 82, electro-optic modulator 84 (and associated high voltage generator 86), and diffraction grating 88. Modulator 84 is a CdTe electro-optic Q switch (manufactured by II-IV Inc). The CdS phase plate 82 is aligned parallel to the polarization axis of the laser. With this configuration, when generator 86 applies zero volts to the modulator 84, the laser runs CW, but when generator 86 applies a high voltage, the laser oscillation is quenched. In operation, generator 86 controls a duty cycle by applying a high voltage so that the oscillator is initially quenched for a suitable time for desired inversion to take place), and then by rapidly decreasing this voltage to zero, causing a Q-switched spike followed by a relatively long quasi-CW oscillation. This duty cycle is repeated to generate a sequence of transmit pulses having the form of FIG. 3.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. An infrared radar system, comprising:
   A. laser means for generating at least one infrared transmit pulse having a spike portion and a CW portion,
   B. means for transmitting said pulse to a target scene,
   C. receiver means for receiving reflections of said transmitted pulse reflected from objects in said scene, and for generating first signals representative of the received reflections of said spike portion, and second signals representative of the received reflection of said CW portion,
   D. first processing means responsive to said first signals for generating data representative of the range of objects in said scene,
   E. second processing means responsive to said second signals for generating data representative of the velocity of objects in said scene.

2. A system according to claim 1 wherein said laser means comprises:
   an infrared laser selectively operable in a pulsed mode or a continuous wave (CW) mode, and
   laser control means for selectively controlling the operational mode of said laser to generate said transmit pulse.

3. A system according to claim 1 or 2 wherein said receiver means comprises:
   an array of detector elements and associated means for imaging said received reflections on said detector elements,
   a local infrared laser and associated means for imaging a reference beam from said local laser on said detector elements,
   wherein said array includes a first set of detector elements, each first set element being adapted to generate said first signals, said first signals being representative of the intensity of the received reflections of said spike portion imaged thereon, and
   wherein said array includes a set of heterodyne detector elements, each heterodyne element being adapted to generate said second signals, said second signals being representative of the difference in frequency between said reference beam and the received reflections of said CW portion imaged thereon.

4. A system according to claim 3 wherein the elements of said first set are direct detector elements.

5. A system according to claim 3 wherein the elements of said first set are heterodyne detector elements.

6. A system according to claim 5 wherein the elements of said first set comprise the elements of said second set.

7. A system according to claim 1 wherein said first processing means further includes means for generating reflectivity data representative of the reflectivity of objects in said scene.

8. A system according to claim 1 or 2 or 7 wherein said first processing network comprises a broadband matched filter adapted to receive said first signals, an envelope detector, and a peak detector, coupled in series, wherein said peak detector includes means for generating a range data signal representative of the time period between said transmit pulse and the received reflection corresponding to the spike portion of said transmit pulse.

9. A system according to claim 1 wherein said second processing means further includes means for generating reflectivity data representative of the reflectivity of objects in said scene.

10. A system according to claim 8 wherein said peak detector further includes means for generating a reflectivity data signal representative of the magnitude of said maximum value.

11. A system according to claims 1 or 2 or 9 wherein said second processing means comprises a plurality of parallel branch networks coupled to an output network, each of said branch networks being adapted to receive said second signals, each of said branch networks including coupled in series:
A. a narrow matched filter adapted to pass a different portion of a predetermined frequency band,
B. a branch envelope detector and
C. a digitizer
wherein said output network includes means for sampling each of said digitizers once for each transmit pulse, and identifying the branch network having the digitizer corresponding to the largest reflection, and generating a velocity data signal representative of the center frequency of the narrow matched filter of said identified branch.

12. A system according to claim 11 wherein said output network further includes means for generating a reflectivity data signal representative of the sum of the digitized signals generated by said digitizers.

13. An infrared radar system, comprising:
A. laser means for generating at least one infrared transmit pulse,
B. means for transmitting said pulse to a target scene,
C. receiver means for receiving reflections of said transmitted pulse reflected from objects in said scene, for receiving passive infrared radiation from said scene, for generating first signals representative of the received reflections from said pulse, and for generating second signals representative of said received passive radiation,
wherein said receiver means includes:
an array of detector elements, wherein each element includes at least one heterodyne detector cell and at least one direct detector cell,
means for imaging said received reflection on said heterodyne detector cells,
local infrared laser and associated means for imaging a reference beam from said local laser on said heterodyne detector cells,
means for imaging said received passive radiation on said direct detector cells, and
wherein said heterodyne detector cells are adapted to generate said first signals, and said direct detector cells are adapted to generate said second signals.

* * * * *